Aug. 6, 1935.  L. B. PICKETT  2,010,197
PITMAN BEARING
Filed Aug. 13, 1934  2 Sheets-Sheet 1
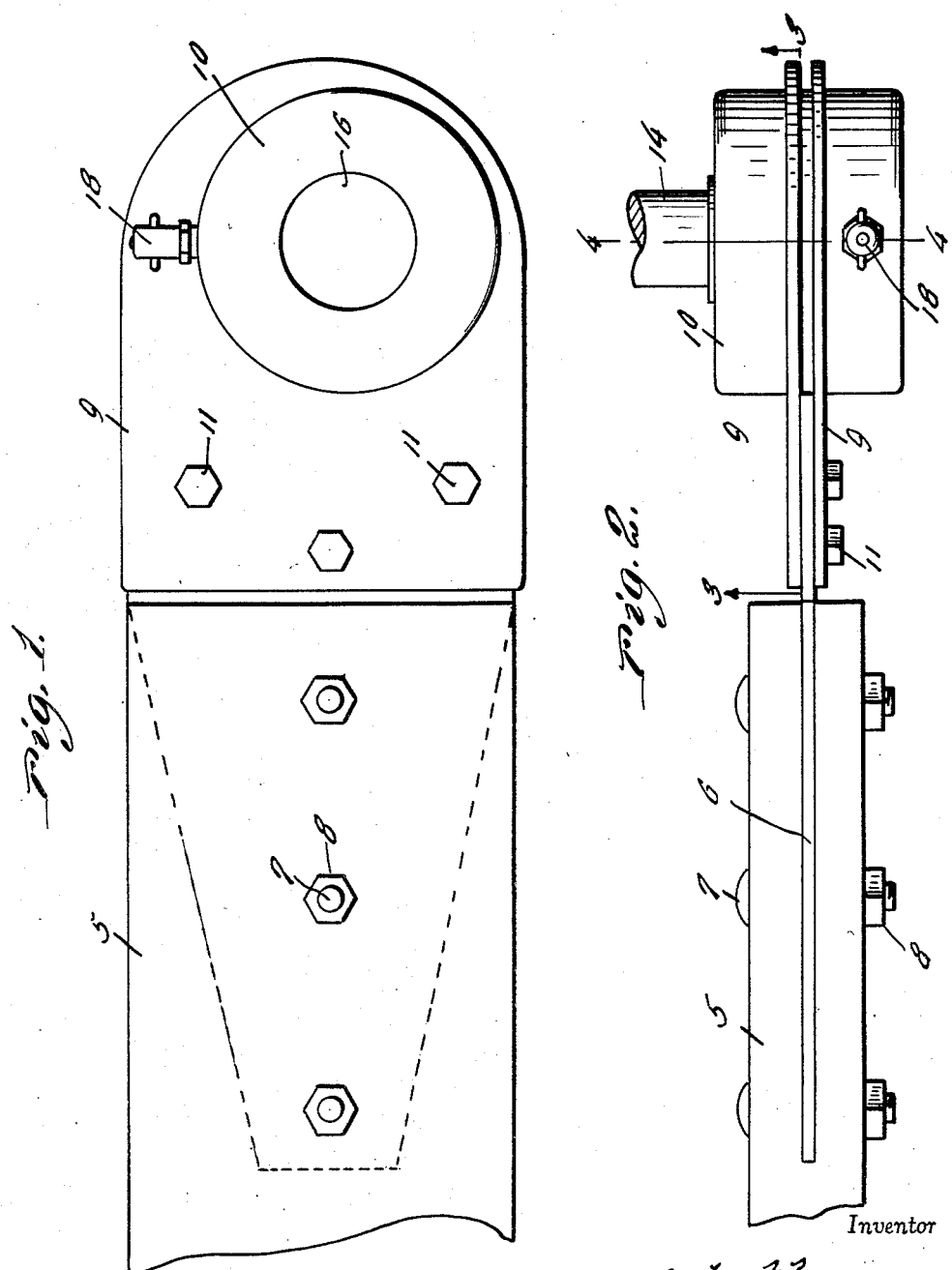
Inventor
L. B. Pickett
By Clarence A. O'Brien
Attorney Aug. 6, 1935.  L. B. PICKETT  2,010,197
PITMAN BEARING
Filed Aug. 13, 1934  2 Sheets-Sheet 2
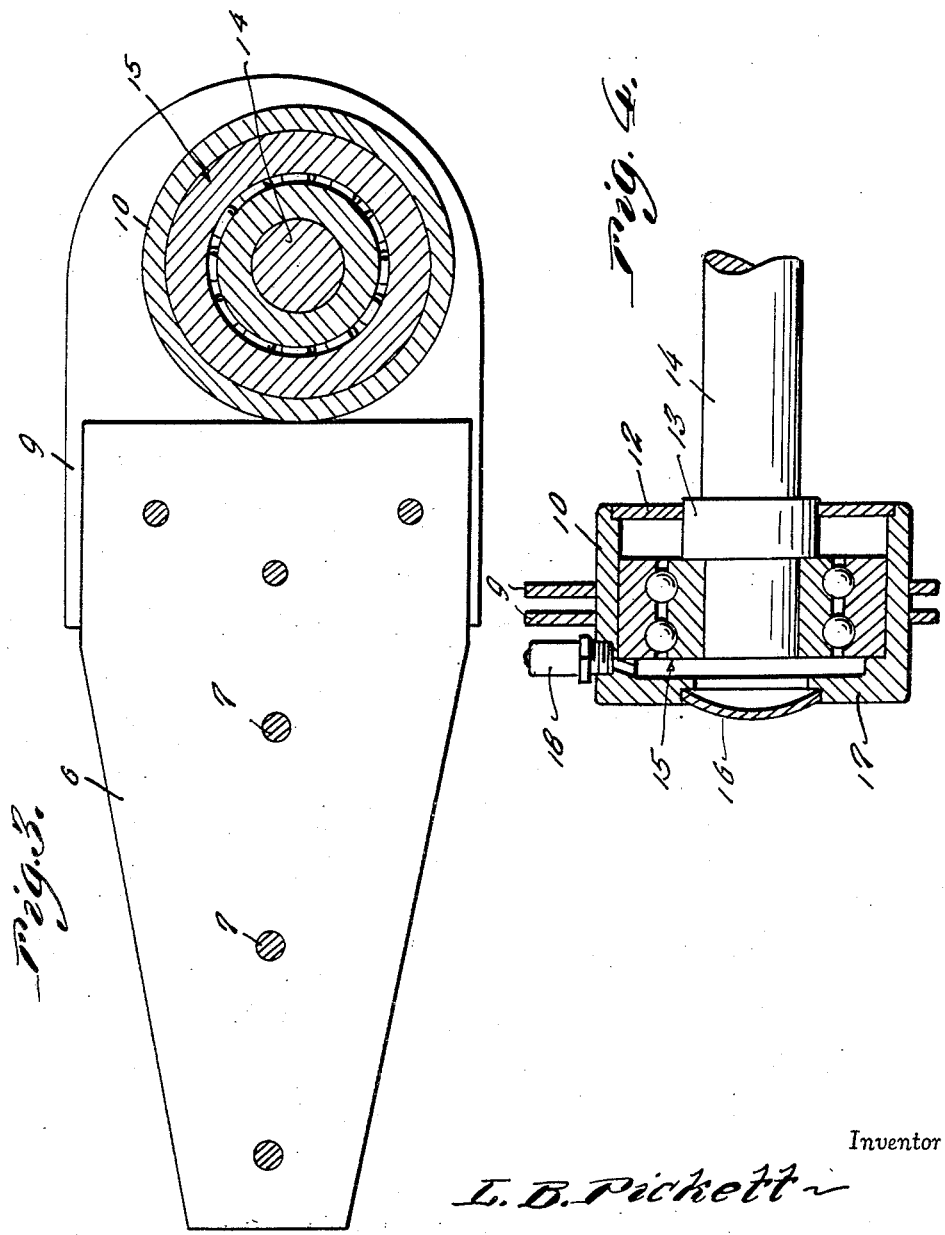
Inventor
L. B. Pickett
By Clarence A. O'Brien
Attorney Patented Aug. 6, 1935

2,010,197

UNITED STATES PATENT OFFICE 2,010,197

PITMAN BEARING

Lloyd B. Pickett, Brawley, Calif.

Application August 13, 1934, Serial No. 739,651

1 Claim. (Cl. 74—579)

This invention appertains to new and useful improvements in bearing structures and more particularly to a bearing structure for the pitmen of mowers, binders, harvesters, or other machines employing a pitman to drive a sickle or similar utility.

The principal object of the present invention is to provide a bearing in which wear will be reduced and in which lubricant can be placed in sufficient quantities to keep the bearing lubricated for a considerable period of time.

During the course of the following specification, other important objects and advantages of the invention will become apparent to the reader.

In the drawings:

Figure 1 is a side elevational view of the bearing in connection with a pitman.

Figure 2 is a top plan view of the bearing fragmentarily showing its association with a pitman.

Figure 3 is a sectional view taken substantially on line 3—3 of Figure 2.

Figure 4 is a sectional view taken substantially on line 4—4 of Figure 2.

Referring to the drawings wherein like numerals designate like parts, it can be seen that numeral 5 represents the pitman beam bifurcated to receive the reduced end portion of the plate 6. This plate is firmly secured in the bifurcated end of the pitman 5 by bolts 7 equipped with nuts 8.

The enlarged end portion of the plate 6 is interposed between the flanges 9—9 which extend entirely around the bearing shell 10. Bolts 11 extend through the flanges and through the adjacent end of the plate 6 to firmly secure the plate to the said flanges and thus connect the pitman 5 to the bearing shell 10. As before stated, the flanges 9—9 extend entirely around the shell 10 and are in some manner secured to the shell as by welding or some similar method or means. The shell 10 has an inner wall 12 provided with a central opening in which the shoulder 13 of the stub shaft 14 operates. The end portion of the stub shaft 14 is located within the shell 10 and is provided with a ball bearing assembly generally referred to by numeral 15. A knock-out 16 is provided in the front wall 17 to permit access to the interior of the bearing structure to permit cleaning out thereof when desired. With the knock-out 16 in place, the shell 10 can be filled with grease by supplying the grease under pressure through the check valve fitting 18.

As can be seen in Figure 4, the interior of the shell 10 affords space adjacent each end wall 12—17 for the accumulation of grease so that grease is constantly supplied to the ball bearing assembly 15 from both sides thereof.

It will be observed, also, that the flanges 9 extending entirely around the shell 10 actually operate as heat dissipating fins to facilitate the dissipation of heat from the bearing.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

In a pitman construction, a pitman bar provided with a longitudinally extending slot at one end, a bearing, a pair of sheet metal members circumscribing the bearing to provide heat dissipating fins, said members being provided with flanges extending from the fins in substantial parallel relation to each other, and a connecting plate between the said flanges and the bar, one edge portion of the plate being disposed between the said flanges and another edge portion of the plate being disposed into the slot of the pitman bar, securing means between the pitman bar and the received edge portion of the plate, and securing means between the flanges and the interposed edge portion of the plate.

LLOYD B. PICKETT.